Feb. 23, 1932.　　　A. W. KIMBELL　　　1,846,736
FASTENER
Filed Jan. 27, 1928
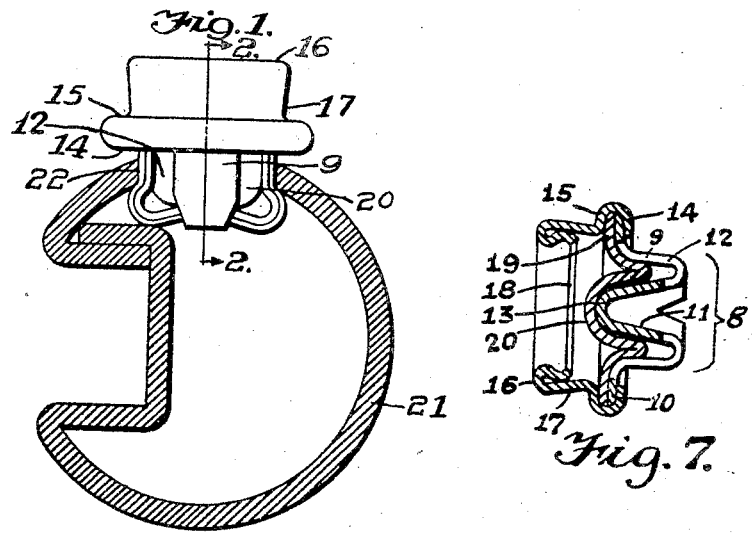
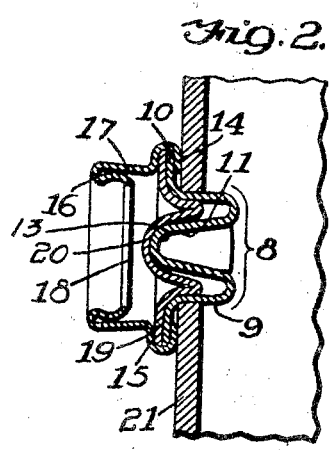
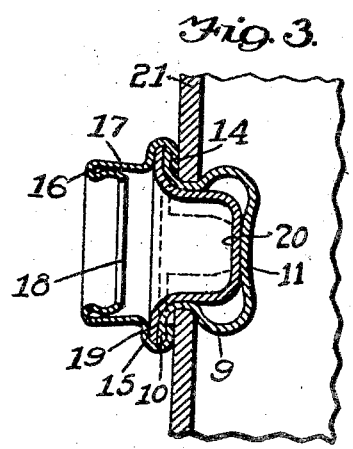
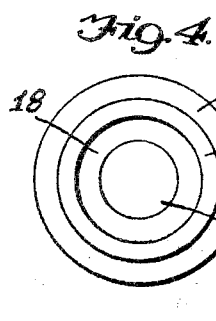
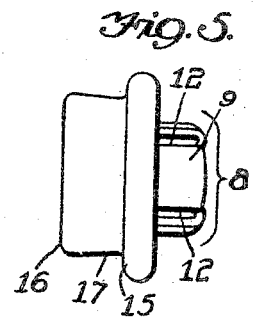
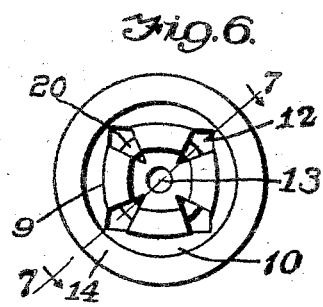
Inventor
Arthur W. Kimbell
By
Attys Patented Feb. 23, 1932

1,846,736

UNITED STATES PATENT OFFICE

ARTHUR W. KIMBELL, OF CHICAGO, ILLINOIS, ASSIGNOR TO CINCH MANUFACTURING CORPORATION, OF CHICAGO, ILLINOIS, A CORPORATION OF ILLINOIS

FASTENER

Application filed January 27, 1928. Serial No. 249,866.

My invention has to do with flush type fastener elements and is particularly directed to securing fastener elements to thin metal parts such as vehicle bodies, windshield posts and like structures.

In the drawings accompanying and forming part of this specification, Figure 1 is a plan section of a windshield post for an automobile showing a stud member (in elevation) secured to the post; Fig. 2 is a section taken on the line 2—2 of Fig. 1, showing the attaching means and closure plate formation before being upset to secure the stud to the post; Fig. 3 is a section taken on the same line as 2—2 but showing the formation of the parts when the stud is completely attached to the post; Fig. 4 is a front view of the stud; Fig. 5 is a side view of the stud; Fig. 6 is a rear view of the stud; and Fig. 7 is a section through the stud taken on the line 7—7 of Fig. 6.

While the drawings show the manner of attaching a stud member to a windshield post, I wish it understood that other types of fastening elements may be attached in a like manner to any suitable supporting structure.

The stud (Figs. 2, 4, 5 and 6), as an article of manufacture and before it is attached to a structure, comprises a cup-shaped portion 8 having a substantially cylindrical side wall 9 and a lip flange 10. The bottom of the cup is upset or pressed inwardly to form a hump 11 which extends toward the mouth of the cup (Fig. 2). The side wall 9 of the cup is slit longitudinally as at 12, and the slits terminate short of the periphery of the lip of the cup (Fig. 7) at one end, while they extend part way into the hump 11 to leave a continuous rounded portion 13 at the end of the hump.

In the form of the invention shown, the lip flange 10 is embraced by an inwardly turned flange 14 of the base 15 of the stud. The stud has a tapering side wall extending away from the base to provide a stud head 16 and neck 17 for receiving a cooperating socket. The central portion of the head 16 is pressed inwardly and the bottom cut out to provide a hole or opening 18, as shown in Fig. 2.

A closure plate is located within the stud unit in fixed relation and has a flange 19 held tightly between the lip flange 10 and base 15. The central portion of the fixed closure plate is pressed up to provide a distortable hump 20 which more or less closely conforms to the hump 11. Both humps face toward the opening 18 (Fig. 2) in the head of the stud.

In applying the stud unit to the metal support or post 21 (Fig. 1), the latter is bored at 22 to provide a hole of a diameter to fit the side wall 9 of the cup and the latter is thrust into the hole 22 until the flange 14 of the base 15 (Figs. 2 and 3) rests against the face of the post 21. In order to expand the side wall 9 of the cup, it is merely necessary to insert a suitable tool through the hole 18 in the stud head and force the hump 20 of the closure plate rearwardly with sufficient force to press both humps 20 and 11 axially of the unit. Thus, the humps are distorted to the positions shown in Figs. 1 and 3. The hump 11 distorts the slitted side wall and bottom portions of the cup in an obvious manner, thereby preventing accidental displacement of the fastener unit due to the enlarged condition of the cup.

The closure plate performs a useful function inasmuch as it is not punctured when upset and therefore closes the cup against passage of water, dust or dirt as clearly illustrated by Fig. 7.

I claim:

1. A fastener installation including a supporting part having a hole therein, a stud member having a cup-shaped attaching portion passing into the hole in the support and having slits therein dividing said cup-shaped portion into a number of expansible portions, a hump presented at the bottom of said cup-shaped portion, and said hump being adapted to be distorted to distort said expansible portions, and a fixed imperforate closure plate provided within the closure plate to close the stud member against the passage of dust, dirt and water through the slits, said cup-shaped portion having a hump adapted to be upset to upset the hump provided at the bottom of the cup.

2. A stud member having a head, a neck and a base and provided with a hole in the head, an attaching portion secured to the base and extending therefrom in the form of a tubular portion having a bottom, the tubular portion and bottom being slit to provide a number of expansible portions, means forming part of the attaching portion for expanding said portions and a closure plate also secured to the base of the stud and having a portion for cooperation with said means to permit attachment of the stud member to a support.

3. A stud member having a head, a neck and a base and provided with a hole in the head, an attaching portion secured to the base and extending therefrom in the form of a tubular portion having a bottom, the tubular portion and bottom being slit to provide a number of expansible portions, a hump extending from the bottom of said attaching portion toward the hole in the stud head, and a fixed closure element secured within said stud member and having a hump portion extending toward the hole in the head whereby when a tool is inserted through the hole the two hump portions may be upset and the closure plate will prevent passage of dust, dirt and water through the stud member.

4. A stud member having a cup slotted to permit lateral expansion for securing the stud to a support, a hump formed at the bottom of said cup and adapted to be moved axially of the cup to expand the side wall of the cup, and a fixed imperforate closure element within the stud for preventing the passage of dust, dirt and water through the slotted cup portion.

5. A snap fastener member having a fastener-receiving portion at one end, a split expansible cup-shaped attaching portion at the other end, expanding means within the cup-shaped attaching portion for expanding said attaching portion to secure the snap fastener member to a support and means within the fastener member for closing the split cup-shaped attaching portion against passage of water, dust or dirt therethrough.

6. A snap fastener unit having a fastener-engaging portion at one end and an expansible portion at the other end, expanding means provided as a part of the snap fastener unit and adapted to expand the expansible portion to secure the snap fastener unit to a support and means having a hump which is adapted when flattened to act upon said expanding means, said means being formed to close said fastener unit against the passage of dust, dirt or water therethrough.

7. A snap fastener unit having a fastener-engaging portion at one end and a split expansible portion at the other end, expanding means provided as a part of the snap fastener unit and adapted to expand the split expansible portion to secure the snap fastener unit to a support and means having a hump which is adapted when flattened to act upon said expanding means, said means being formed to close said fastener unit against the passage of dust, dirt or water therethrough.

8. A fastener member having a portion for cooperation with another fastener member, and a cup shaped attaching portion for securing the fastener member to a support, said cup shaped attaching portion being slit to provide a number of readily distortable portions and a fixed imperforate closure plate within the fastener member being formed to close the slits to prevent passage of dust, dirt and water through the fastener.

9. A fastener stud adapted to be set into an aperture in an article of work and expanded therein, said stud comprising a tubular socket engaging portion forming a head and a neck, a cup shaped shank portion, a shouldered portion joining said tubular socket engaging portion and cup shaped shank portion, said shank portion having an inwardly bulged bottom formed prior to attachment to a support, the stud being open above said bottom, to permit the introduction of a fastener member to act upon the inner surface of said bottom, thereby forcing the bulge outwardly to expand the wall of said shank portion against the wall of the aperture in the article of work.

10. A fastener stud adapted to be set into an aperture in an article of work and expanded therein, said stud comprising a tubular socket engaging portion forming a head and a neck and a cup shaped shank portion separate from said socket engaging portion, one of said portions forming an outwardly turned flange over which the other portion is crimped, to secure the portions together, said shank portion having an inwardly bulged bottom prior to attachment to a support, the stud being open above said bottom, to permit the introduction of a fastener member to act upon the inner surface of said bottom, thereby forcing the bulge outwardly to expand the wall of said shank portion against the wall of the aperture in the article of work.

11. A fastener stud adapted to be set into an aperture in an article of work and expanded therein, said stud comprising a tubular socket engaging portion forming a head and a neck, a cup shaped shank portion, a shouldered portion joining said tubular socket engaging portion and cup shaped shank portion, said shank portion having a slitted inwardly bulged bottom formed prior to attachment to a support, the stud being open above said bottom to permit the introduction of a fastener member to act upon the inner surface of said bottom, thereby forcing the bulge outwardly to expand the wall of said shank portion against the wall of the aperture in the article of work.

12. A fastener element comprising a clinching member, spaced inner and outer walls on said clinching member, a closed bottom on the inner wall, said walls having spaced slots therethrough for forming yieldable sections therebetween, an engaging member opposed to said clinching member and provided with spaced inner and outer walls, and a shoulder forming part of both of said members and projecting outwardly therefrom, said shoulder being of greater outermost diameter than that of any other part of said element.

13. A snap fastener stud member in the form of a tubular member having a flange between the ends thereof, a head and neck portion located at one side of said flange, means providing a normally open passage through the outer end of the head to the interior of the stud member, a laterally expansible attaching portion located at the other side of the flange and a movable plug located within the stud member and operable by an instrument passed through the passage in the head and engaged directly therewith to expand said attaching element for securing the stud member to a support.

14. A fastener stud adapted to be set into an aperture in an article of work and having a portion adapted to be expanded therein, said stud comprising a socket-engaging portion forming a head and a neck for cooperative engagement with a fastener socket, a shank portion having a bottom, an annular shoulder between the shank portion and the socket-engaging portion, a hump formed in the bottom of the shank portion and normally located within the shank portion, and means providing an opening in the head of the socket-engaging portion, thereby to permit the introduction of a suitable tool whereby the hump may be flattened, thereby laterally to expand the wall of said shank portion to secure said fastener stud to the article of work.

15. A snap fastener installation comprising, in combination, a rigid structure having an aperture therethrough, a snap fastener member having a shoulder engaging the front face of said structure adjacent to the aperture therethrough, a cup-shaped shank portion extending through said aperture and being expanded laterally throughout its length beginning immediately beyond the inner face of said structure, said shank portion having an inwardly bulged bottom formed prior to attachment to the rigid structure, an opening in said fastener opposite the inwardly bulged bottom of the shank portion and a fixed closure plate located within the fastener member and having a hump portion cooperating with the inwardly bulged bottom of the shank whereby a tool may be inserted through the opening in the fastener member to force the hump portion of the fixed closure element and the bulged bottom of the shank outwardly to expand the wall of the shank and secure the fastener member to the rigid structure.

In testimony whereof, I have signed my name to this specification.

ARTHUR W. KIMBELL.

CERTIFICATE OF CORRECTION.

Patent No. 1,846,736.　　　　　　　　　　　Granted February 23, 1932, to

ARTHUR W. KIMBELL.

It is hereby certified that error appears in the printed specification of the above numbered patent requiring correction as follows: Page 2, line 3, claim 1, strike out the words "closure plate" and insert cup-shaped portion, and line 6, same claim, for "cup-shaped portion" read closure plate; and that the said Letters Patent should be read with these corrections therein that the same may conform to the record of the case in the Patent Office.

Signed and sealed this 22nd day of March, A. D. 1932.

(Seal)
　　　　　　　　　　　　　　　　　　　　M. J. Moore,
　　　　　　　　　　　　　　　　　Acting Commissioner of Patents.